United States Patent
Baker et al.

(10) Patent No.: US 11,322,020 B2
(45) Date of Patent: May 3, 2022

(54) SYNCHRONIZATION SIGNALING SYSTEM

(71) Applicant: EMERGENCY TECHNOLOGY, INC., Hudsonville, MI (US)

(72) Inventors: Douglas V. Baker, Hudsonville, MI (US); Kyle Israels, Hudsonville, MI (US)

(73) Assignee: Emergency Technology, Inc., Hudsonville, MI (US)

( * ) Notice: Subject to any disclaimer, the term of this patent is extended or adjusted under 35 U.S.C. 154(b) by 0 days.

(21) Appl. No.: 16/684,706

(22) Filed: Nov. 15, 2019

(65) Prior Publication Data

US 2020/0090508 A1    Mar. 19, 2020

Related U.S. Application Data

(63) Continuation-in-part of application No. PCT/US2019/042138, filed on Jul. 17, 2019.

(60) Provisional application No. 62/699,839, filed on Jul. 18, 2018.

(51) Int. Cl.
| | |
|---|---|
| *G08G 1/081* | (2006.01) |
| *G08G 1/0962* | (2006.01) |
| *G08G 1/0965* | (2006.01) |
| *H04W 56/00* | (2009.01) |

(52) U.S. Cl.
CPC .......... *G08G 1/081* (2013.01); *G08G 1/0965* (2013.01); *G08G 1/09626* (2013.01); *H04W 56/001* (2013.01)

(58) Field of Classification Search
CPC .. G08G 1/081; G08G 1/09626; G08G 1/0965; H04W 56/001; B60Q 5/005; B60Q 1/2611; B60Q 1/52; G08B 5/38
See application file for complete search history.

(56) References Cited

U.S. PATENT DOCUMENTS

| | | | |
|---|---|---|---|
| 5,644,291 A | 7/1997 | Jozwik | |
| 7,095,318 B1* | 8/2006 | Bekhor | B60Q 1/26 340/485 |
| 7,310,327 B2 | 12/2007 | Fehr | |
| 2007/0159354 A1 | 7/2007 | Rosenberg | |
| 2009/0231159 A1 | 9/2009 | Selevan | |
| 2012/0212320 A1* | 8/2012 | Oberholtzer | B60Q 1/52 340/3.2 |
| 2013/0154821 A1* | 6/2013 | Miller | G08C 17/02 340/471 |

(Continued)

FOREIGN PATENT DOCUMENTS

| | | |
|---|---|---|
| JP | 4803832 B2 | 10/2011 |
| KR | 1020130117002 A | 10/2013 |
| WO | 2017078452 A1 | 5/2017 |

OTHER PUBLICATIONS

Hye Lyun Park, Authorized Officer, International Search Report issued in related PCT Patent Application No. PCT/US2019/042138, 14 pages, dated Nov. 6, 2019, Republic of Korea.

*Primary Examiner* — James J Yang
(74) *Attorney, Agent, or Firm* — McGarry Bair PC (57) ABSTRACT

A synchronization signaling system, comprising a set of alert devices comprising at least one of a visual or audio output for producing an alert pattern, a master clock, a timing device capable of receiving updates from the master clock, a controller operably connected with the set of alert devices to control the set of alert devices.

21 Claims, 7 Drawing Sheets

(56) References Cited

U.S. PATENT DOCUMENTS

| | | | |
|---|---|---|---|
| 2014/0197969 A1* | 7/2014 | Bernard | E01F 9/615 340/944 |
| 2015/0309177 A1 | 10/2015 | Wallace et al. | |
| 2017/0088046 A1 | 3/2017 | Denny et al. | |

* cited by examiner

SYNCHRONIZATION SIGNALING SYSTEM

CROSS REFERENCE TO RELATED APPLICATIONS

This application is a continuation-in-part application of Application No. PCT/US2019/042138 filed on Jul. 17, 2019 which claims the benefit of U.S. Provisional Application Ser. No. 62/699,839, filed Jul. 18, 2018, which is incorporated herein by reference in its entirety.

BACKGROUND

This invention relates to electronically controlled signaling equipment. In one aspect the disclosure relates to signaling or indicators, including but not limited to visual, in one example lighting equipment and audio, in one example siren equipment, as in mobile or stationary vehicle applications.

In emergency situations mobile and stationary vehicle applications can include an emergency signaling system to draw the attention of motorists and pedestrians to the emergency situation in order to avoid the area in which the emergency situation has occurred. Accomplishing this function provides safety to the driver of the emergency vehicle and approaching motorists and pedestrians. Each signaling module on either a mobile or stationary application, can require control of a lightbar, perimeter lights, siren, headlight flashers, etc. and then programmed with configurations, flash patterns, and priorities.

Multiple emergency vehicles and other signaling devices in a common location can produce lighting and audio signaling that appear confusing to an onlooker due to each device having different flashing patterns, different lighting, and different physical locations. This effect can be saturating to the visual responses of an onlooker, and does not conduce the driver approaching to distinguish well things going on in the common location and in some documented cases can cause a driver to drive toward the common location.

SUMMARY OF INVENTION

In one aspect, the present disclosure relates to a synchronization signaling system, comprising a portable interface, a portable set of alert devices in communication with the portable interface and comprising at least one of a visual or audio output for producing an alert pattern, a master clock, a timing device capable of receiving updates from the master clock, a master controller operably connected with the portable interface to control the portable set of alert devices, wherein the timing device is updated by the master clock in order to synchronize the alert pattern to a common synchronized alert pattern output by the master controller.

In another aspect, the present disclosure relates to a remote synchronization signaling system, comprising: a localized set of alert devices comprising at least one of a visual or audio output for producing an alert pattern, a master clock, a timing device capable of receiving updates from the master clock, a localized controller in proximity to and operably connected with the localized set of alert devices to control the localized set of alert devices, and a remote power source for powering the remote synchronization signaling system, wherein the localized set of alert devices are multiple sequential alert devices each having a timing device that is updated by the master clock in order to synchronize the alert pattern output of each sequential alert device to a common synchronized alert pattern output by the localized controller.

DETAILED DESCRIPTION

Aspects of the disclosure are related to synchronized signaling equipment and can be can be implemented in any environment, apparatus, or method for providing signal information in the form of lighting or sound. In an exemplary configuration, aspects of the disclosure can be included as visual or audio elements or supplementary visual or audio elements for alert systems associated with an independent alert signaling unit, which for example can include vehicles, emergency vehicles, or other units associated with vehicle or emergency vehicle (e.g. cones or flashers that can be stored in and set up proximate to the vehicle). For example, one non-limiting aspect of the disclosure can be utilized to provide active visual alert, awareness, signaling, or illumination, such as visual or lighting warnings, to attract the attention of motorists and pedestrians to the vehicle's presence or approach.

While a "vehicle" is described, aspects of the disclosure can be applied to any vehicles, including, but not limited to, emergency or safety vehicles or devices (e.g. fire trucks, ambulances, law enforcement vehicles, authorized vehicles, or the like), construction vehicles (e.g. cars, trucks, construction equipment, bulldozers, cranes, or the like), land-based vehicles (pedestrian automobiles, motorbikes, all-terrain vehicles, or the like), sea-based vehicles (boats, barges, or the like), or air-based vehicles (aircraft, blimps, balloons, or the like). Non-limiting examples of vehicles can include, for instance, cars, trucks, semi-trucks, cargo carriers, boats, aircraft, and trains. Furthermore, as used herein, a vehicle does not need to include an independent propulsion system, and can include, for example, train cars, barges, trailers, semi-trailers, bicycles, or the like. In addition to vehicles, non-limiting aspects of the disclosure can also be included in stationary illumination applications or "units," such as signage, security lighting, or the like that can be separate from or associated with a vehicle.

While "a set of" various elements will be described, it will be understood that "a set" can include any number of the respective elements, including only one element. As used herein, the terms "axial" or "axially" refer to a dimension along a longitudinal axis described. The terms "fore" or "forward" refers to a vector in the direction of illumination of a lighting element, while the terms "aft," "backward," or "rear" used in refers to a direction opposite to the vector in the direction of illumination of the lighting element, or toward the rear lighting element.

As used herein, the terms "radial" or "radially" refer to a dimension extending between a center longitudinal axis described, an outer circumference, or a circular or annular component described.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

As used herein, a "system," a "controller," or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Figure 1:
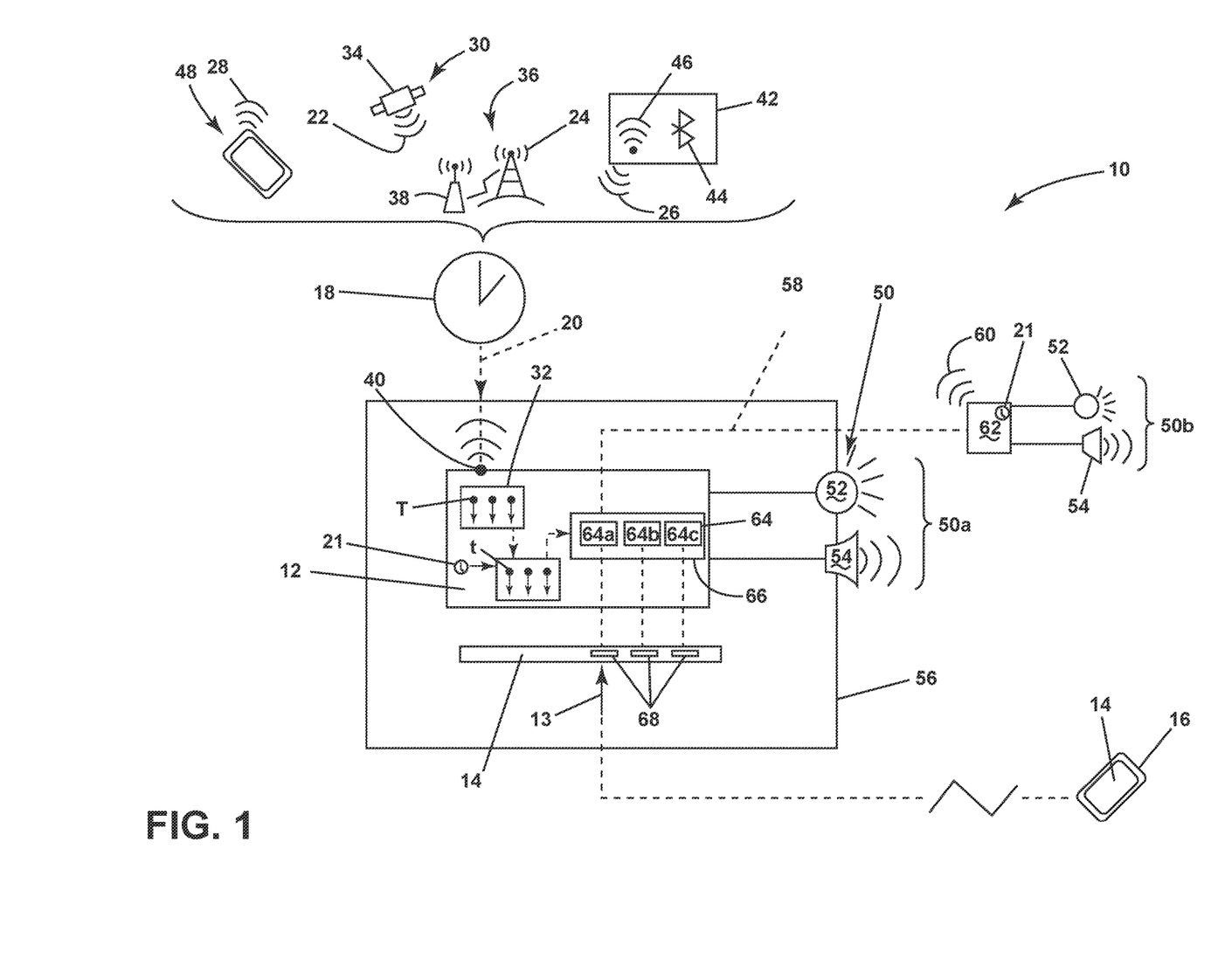
FIG. 1 illustrates a schematic of a synchronization signaling system with a set of alert devices.

FIG. 1 is a schematic illustration of a synchronization signaling system 10. The synchronization signaling system 10 includes a master controller 12 for receiving a user input 13, by way of non-limiting example via a user interface 14. The user interface 14 can be directly mounted to the master controller 12 or be separate from the master controller 12, by way of non-limiting example on a hand held communication device such as a smart phone 16. It is further contemplated that the user interface 14 can be hardwired and in communication with the smart phone 16.

A master clock 18 is in communication with the master controller 12. The master clock 18 can provide a timing reference signal 20 for the synchronization signaling system 10. By way of non-limiting example, the timing reference signal 20 can include a global master clock signal 22, a regional master clock signal 24, a local master clock signal 26, or a cellular master clock signal 28, all or any capable of providing the timing reference signal 20 to be received by the master controller 12. The precision level at which the synchronization signaling system 10 operates is dependent on the frequency that the timing reference signal 20 is received and the accuracy of the timing reference signal. As used herein, "precision level" refers to the resolution at which the timing reference signal 20 delivering a master clock time (T) matches a local clock 21 time, or local time (t) associated with the synchronization signaling system 10. As used herein, "local" means localized to the alert unit, vehicle, or the like, also carrying, containing, or otherwise including the master controller 12. In contrast, "remote" means removed or otherwise not carried, contained by, or otherwise included by the unit or vehicle having the master controller 12.

The exemplary global master clock signal 22 can be provided by a typical global navigational satellite system (GNSS) 30 where timing information is received in a chipset 32 via a satellite 34 that is precise on the order of nanosecond resolution. While GNSS 30 does not require special licensing, it does require clear signal and therefore is sufficient from timing accuracy, but may have reliability issues (tunnels, tall buildings, weather, etc.).

The exemplary regional master clock signal 24 can be provided by a line of site radio frequency system such as Dedicated Short Range Communications Service (DSRC) 36. This approved for use in the US at 5.850 to 5.925 GHz frequency, by exchanging direct data from road site units (RSU) 38 to on-board units (OBU) 40 at data rates of 3 to 27 Mb/s. This architecture can offer microsecond resolution. DSRC 36 is licensed and regulated, and only works where infrastructure is deployed. Therefore DSRC 36 is sufficient from a timing accuracy, but may have reliability issues (geographic obstacles, installed availability limitations, tunnels, tall buildings, etc.).

The exemplary local master clock signal 26 can be provided by a low power signal for a short range coordination area 42. Examples of transmission enabling technology are Bluetooth 44, WiFi 46, strobe light emitters, garage door opener systems such as Homelink, personal "walkie-talkie" communication devices using FRS/GMRS (family radio service), Zigbee, and other short range point to point technology. The acceptable frequency ranges are also regulated, from the MHz to low GHz bands. This example is sufficient for timing coordination not from an absolute common timing method, but by a single point originated broadcast perspective with no network delays and minimized reliability issues of geography, buildings, etc.

The exemplary cellular master clock signal 28 can be provided by a cellular network 48 that, when working, can have global, regional, and local usage. As more and more devices attain Internet of Things connectivity, one robustness issue of having multiple devices remaining connected with precise synchronization is when interference or cellular network bandwidth priority fluctuations affect multiple recipients differently. The cellular network 48 has the technical capacity for precise microsecond timing but also the inherent reliability issues stated above. It should be understood that the disclosure described herein can utilize any or all sources of timing including those described above in combination.

The synchronization signaling system 10 further includes at least one set of alert devices 50, illustrated as a local set of alert devices 50a and a remote set of alert devices 50b. The at least one set of alert devices 50 can include visual outputs 52 such as flashing lights, strobe lights, different color lights, LED lights, along with audio outputs 54 such as sirens, speakers, horns, and any other type of alert device. By way of non-limiting example, a lightbar 63 (FIG. 3) on an emergency vehicle 56, schematically illustrated as a box and more clearly depicted in FIG. 3, can be a local alert device 50a for the synchronized signaling system 10, whereas a cone 64 (FIG. 3) not connected with the emergency vehicle 56 can be a remote alert device 50b for the same synchronization signaling system 10. The remote set of alert devices 50b is in communication with the master controller 12 either through a direct wired connection 58 or a wireless connection 60.

A separate interface 62 can be coupled to the remote set of alert devices 50b for receiving signals from the master controller 12. The separate interface 62 can command and operate the remote set of alert devices 50b. A local clock 21 can also be associated with the separate interface 62. The separate interface 62 can be a wired or wireless interface, can include power, and can include further timing control information downstream with respect to the remote set of alert devices 50b while remaining in communication with the master controller 12. The remote set of alert devices 50b can be lighting elements that are movable, or otherwise deployable, and not fixed to the vehicle 56.

At least one pattern cycle 64, illustrated as three pattern cycles 64a, 64b, 64c, can be stored in a memory 66 for the master controller 12. The at least one pattern cycle 64 can be an alert pattern cycle 64a in the form of a flashing sequence, a sound sequence, or a combination of a flashing and sound sequence, or the like. The at least one pattern cycle 64 can therefore be a repeatable sequence or alert pattern that can be communicated to the at least one set of alert devices 50 described herein. A selector 68 associated with the at least one pattern cycle 64 can be available for selection by a user input 13 on the user interface 14. The selector 68 can be in the form of a button or selectable icon associated with different pattern cycles 64a, 64b, 64c available for selection.

Each control device disclosed, including but not limited to the master controller 12, user interface 14, and separate interface 62, can keep a relative timer frame for example in 1.0 millisecond frames utilizing the local clock 21. The timing reference signal 20 can be periodically received at each control device in order to adjust the local time (t). The adjustment of the local time (t) at each control device can provide a precise frame response for multiple control devices.

A period between receiving the timing reference signal 20 from the master clock 18 can be relatively long, as in a full hour, or short, as in a minute, or even shorter, between 5 ms and 20 ms, depending on where the timing reference signal 20 is originating and the reliability of the master clock 18 in each scenario described herein. In non-limiting examples, the master clock time (T) update frequency can include always adjusting the local time (t) to update from the master clock 18, only adjusting the local time (t) if the master clock 18 is a "newer than existing" time, only adjusting the local time (t) if the master clock time (T) differs from the local time (t) and the master clock 18 update is more qualified than the previous update. By way of non-limiting example if the local time (t) is free-running since startup and did not have a previous update or the new master update was from a GNSS source which has a fix on more satellites than the previous update was generated with. The master clock time (T) can also be updated with GNSS where the local time (t) is updated with data from every master clock time (T) update as long as the GNSS receiver has a valid fix on multiple satellites. Using master clock time (T) updates which have nanosecond or microsecond coordinated precision easily allows common frame timing periods of 1.0 millisecond to be accomplished.

Non-limiting aspects of the disclosure can relate to electronically controlled signaling equipment. This can include addressing lighting (visual) and siren (audio) equipment, and specifically on mobile or movable vehicles. In particular instances, safety vehicles or devices, alert vehicles or devices, This enables improved or increased safety visibility for roadway vehicles such as first responder, law enforcement, traffic management, and the like to attain a coordinated, scheduled, aligned, complementary, "synchronized," or the like, visual or audible safety presentation as a unified or coordinated group of vehicles rather than a group of vehicles with dissimilar or non-synchronized random visual lighting or audible strategies. Stated another way, the set of vehicles can present a unified or synchronized alert system, whereby individual alert systems (e.g. visible and/or audible) for each vehicle can be controlled, assigned, enabled, or otherwise operable under a common synchronized control schema, there is a direct benefit of appearing unified for an observer or viewer. This benefit can result in improved or more predictable safety response strategies for the responders and the public at large.

The coordinated common synchronized lighting alert pattern enables advanced roadway safety initiatives. Multiple vehicles with random high intensity patterns can have a negative safety effect of causing certain drivers to actually drive toward vehicles with active warning lighting on, even if not intending to. High intensity random lighting visual fixation is a real human experience, and can be affected by many variables such as substance impairment, weather, vehicle condition, and so on. Moth to flame effect, in some aspects known as phototaxis. By designing patterns that cause multiple vehicles to have discernable commonality (light level, timing, pattern, color), a goal of the synchronization signaling system is to enable the visual determination of nearby vehicle operators to recognize, discern, and react appropriately.

Figure 2:
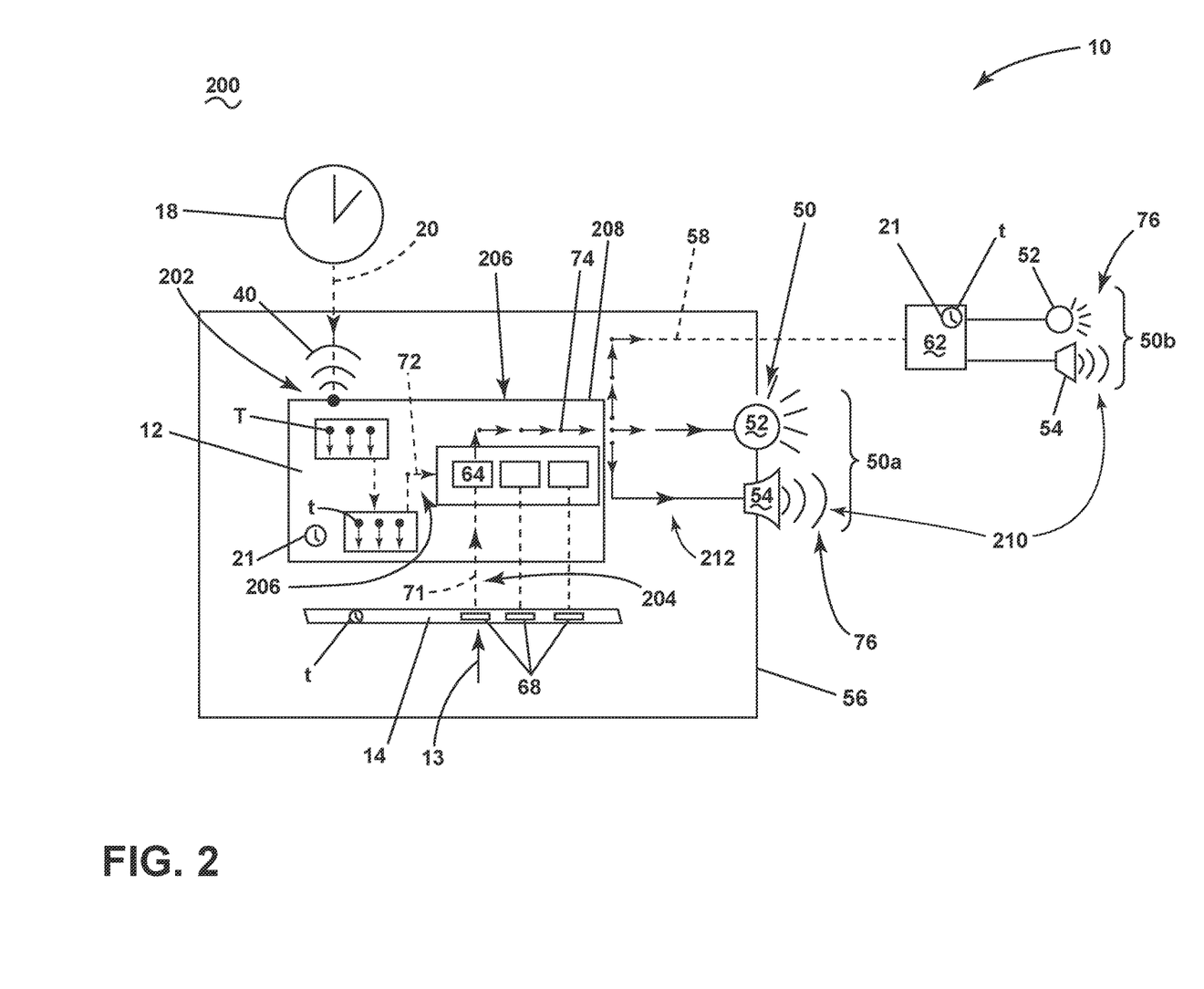
FIG. 2 is the schematic of the synchronization signaling system of FIG. 1 figuratively illustrating a method for coordinating an output sequence for the set of alert devices.

A method 200 for operating the synchronization signaling system 10 for the set of alert devices 50 is illustrated in FIG. 2. The method includes at 202 receiving the timing reference signal 20 to define the master clock time (T). At 204 receiving a pattern request 71 associated with the selector 68 and the alert pattern cycle 64a selected from the user interface 14. At 206 determining an offset period of time $T_o$ for determining an updated starting time 74 (e.g. the updated starting time 74 "offset" or compensated for relative to when the pattern request 71 is received) for the alert pattern cycle 64a, as will be described below. At 208, the method 200 includes determining the updated time 74 to operate the set of alert devices 50 in accordance with the alert pattern cycle 64a. At 210 operating the set of alert devices 50 such that the set of alert devices 50 are coordinated to output a common synchronized alert pattern 76. The method 200 can also include signaling the set of alert devices 50 to output the alert pattern cycle 64a.

Utilization of the timing reference signal 20 described herein, when available, to tag events can provide reference for the set of alert devices 50. The synchronizing could be on a shift-change basis (e.g. based on a schedule, such as working shift-based, or another schedule) while all or most alert devices 50 are proximate (e.g. located within a proximity of each other), or otherwise positioned to receive the timing reference signal 20. The more frequent the master synchronizing or master clock signals, the better the precision for each local time (t) of the control devices described herein.

Figure 3:
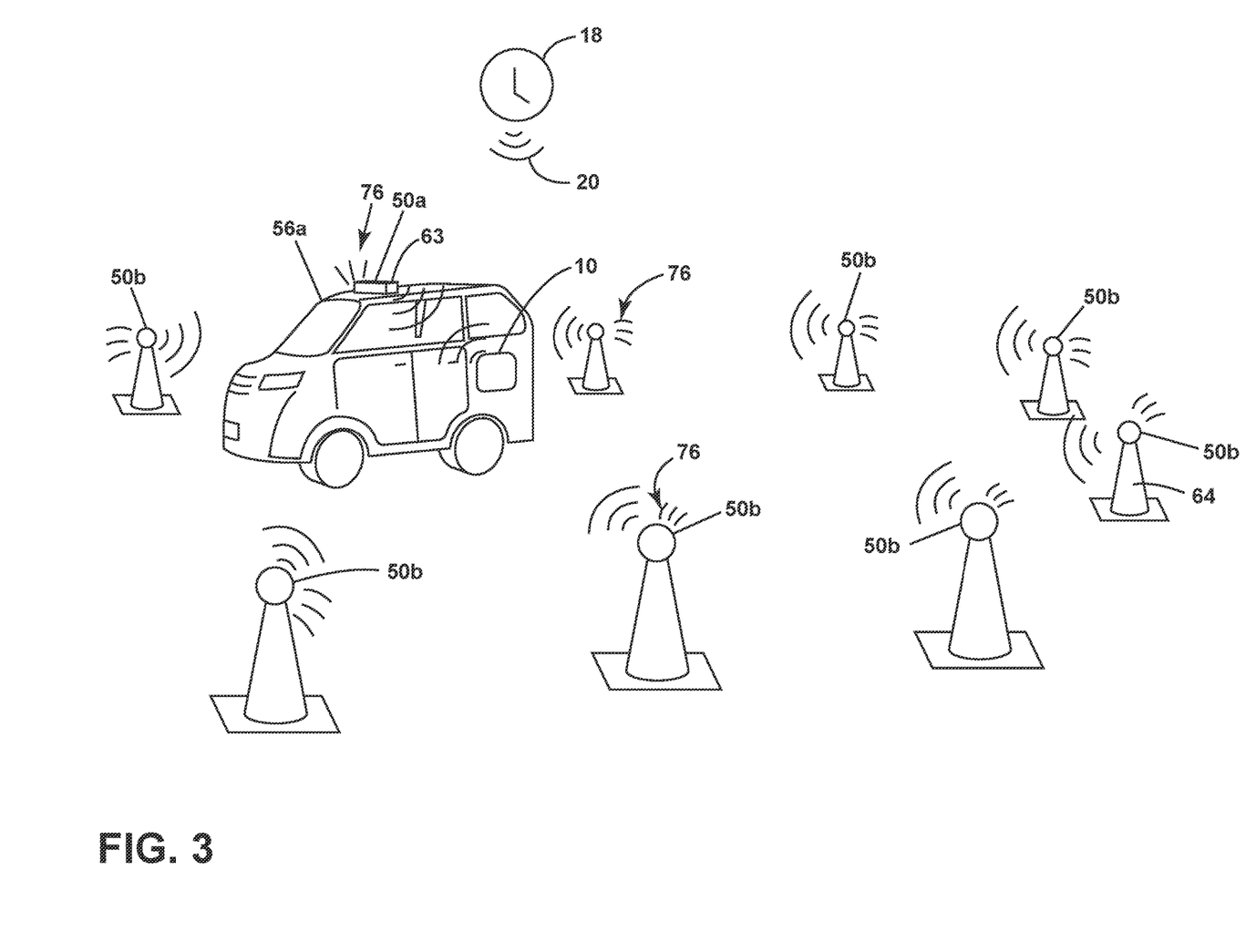
FIG. 3 an exemplary scenario of the synchronization signaling system in operation according to an aspect of the disclosure herein.

Turning to FIG. 3, a vehicle, for example shown as an emergency vehicle 56a, includes a local set of alert devices 50a illustrated as a lightbar 63. While a lightbar 63 is illustrated a set of alert devices 50a can include audible alerts, visual alerts, or the like. An orientation and placement of the remote set of alert devices 50b, such as alert units, vehicles, emergency vehicles, or the like, are adapted to the needs of a particular scene of operation, such as at a work cite, at an emergency site, at the scene of an accident, or the like. By way of non-limiting example, the remote set of alert devices 50b are units (e.g. non-vehicle units) in the form of lights on top of cones 64 displaced around the emergency vehicle 56a. In an exemplary scenario, the master clock 18 can provide a timing reference signal 20 to the synchronization signaling system 10 located within the emergency vehicle 56a. In turn, each of the local set of alert devices 50a and the remote set of alert devices 50b can be in communication with the synchronized signaling system 10 to receive signals that can initiate a common synchronized alert pattern 76, as explained herein. Communication between the remote set of alert devices 50b and the synchronized signaling system 10 is represented by way of the signals of the set of alert devices 50b being directed toward the emergency vehicle 56a.

Figure 4:
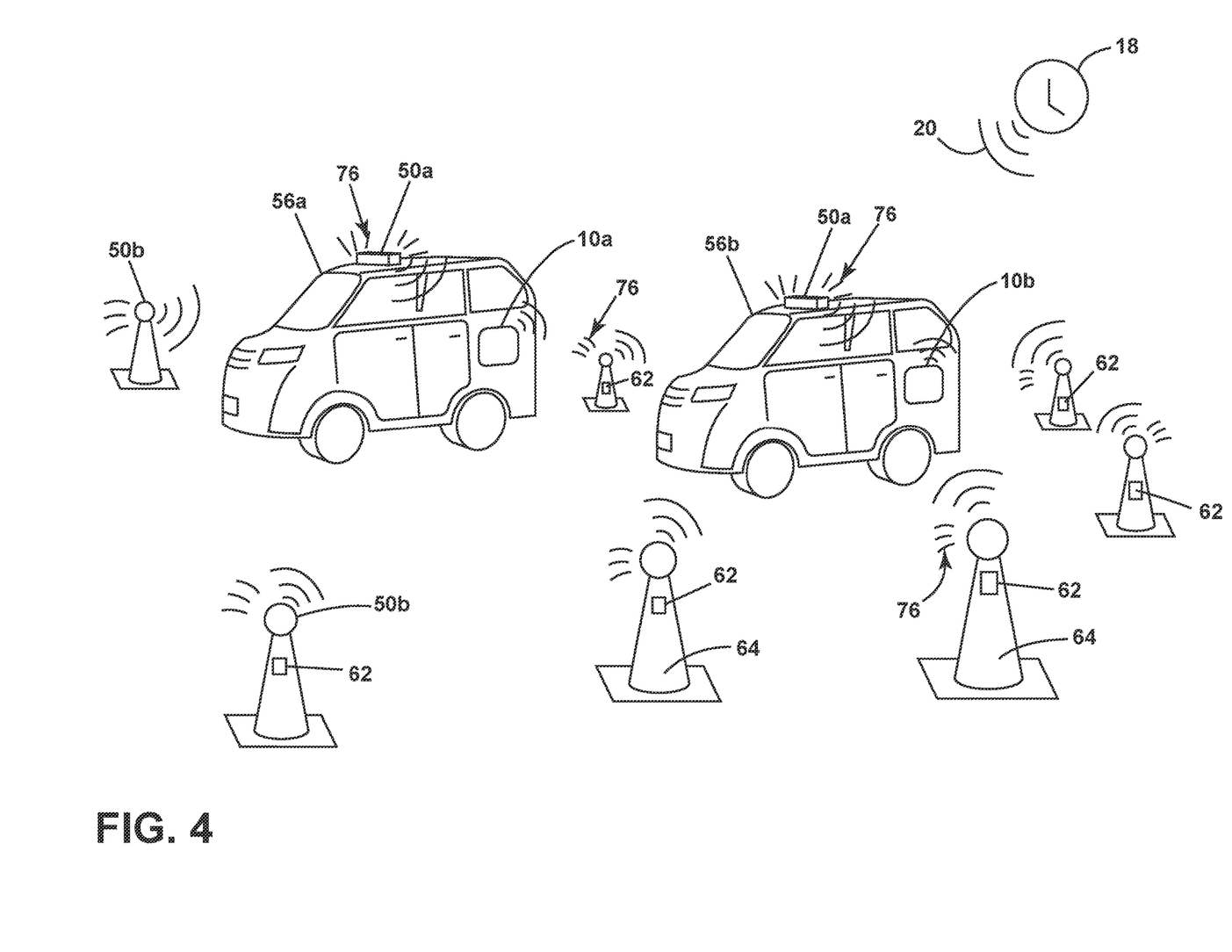
FIG. 4 is an exemplary scenario of the synchronization signaling system in operation according to another aspect of the disclosure herein.

In another scenario illustrated in FIG. 4, the master clock 18 can provide a timing reference signal 20 to the synchronization signaling system 10a located within the emergency vehicle 56a and to each of the separate interfaces 62 associated with each remote set of alert devices 50b. Additionally a second emergency vehicle 56b also having a local set of alert devices 50a can include a synchronized signaling system 10b that receives the timing reference signal 20. In turn, each of the local set of alert devices 50a and the remote set of alert devices 50b can receive signals that initiate a common synchronized alert pattern 76 without necessarily being in communication with each other. In other words, each of the vehicles 56a, 56b and cones 64 communicate separately with the master clock 18, and therefore in a scenario where one vehicle leaves the scene, the common synchronized alert pattern 76 can continue without interruption. As shown in FIG. 4, communication between the master clock 18 and each of the vehicles 56a, 56b and cones 64 is represented by way of the set of signals from the respective vehicles 56a, 56b and cones 64 being directed toward the master clock 18. In this sense, each of the separate interfaces 62 of the remote set of alert devices 50b can include an independent synchronized signaling system 10, 10a, 10b, which can include preselection of patterning, or remote receiving of patterning instruction, as explained herein.

Both exemplary scenarios provide coordinated lighting and/or audio components at a site or emergency scene. This can give a single vehicle a very wide/large dimensional perception from a far distance, where the lighting is all synchronized. This can enable improved road blocking signaling intent.

Figure 5:
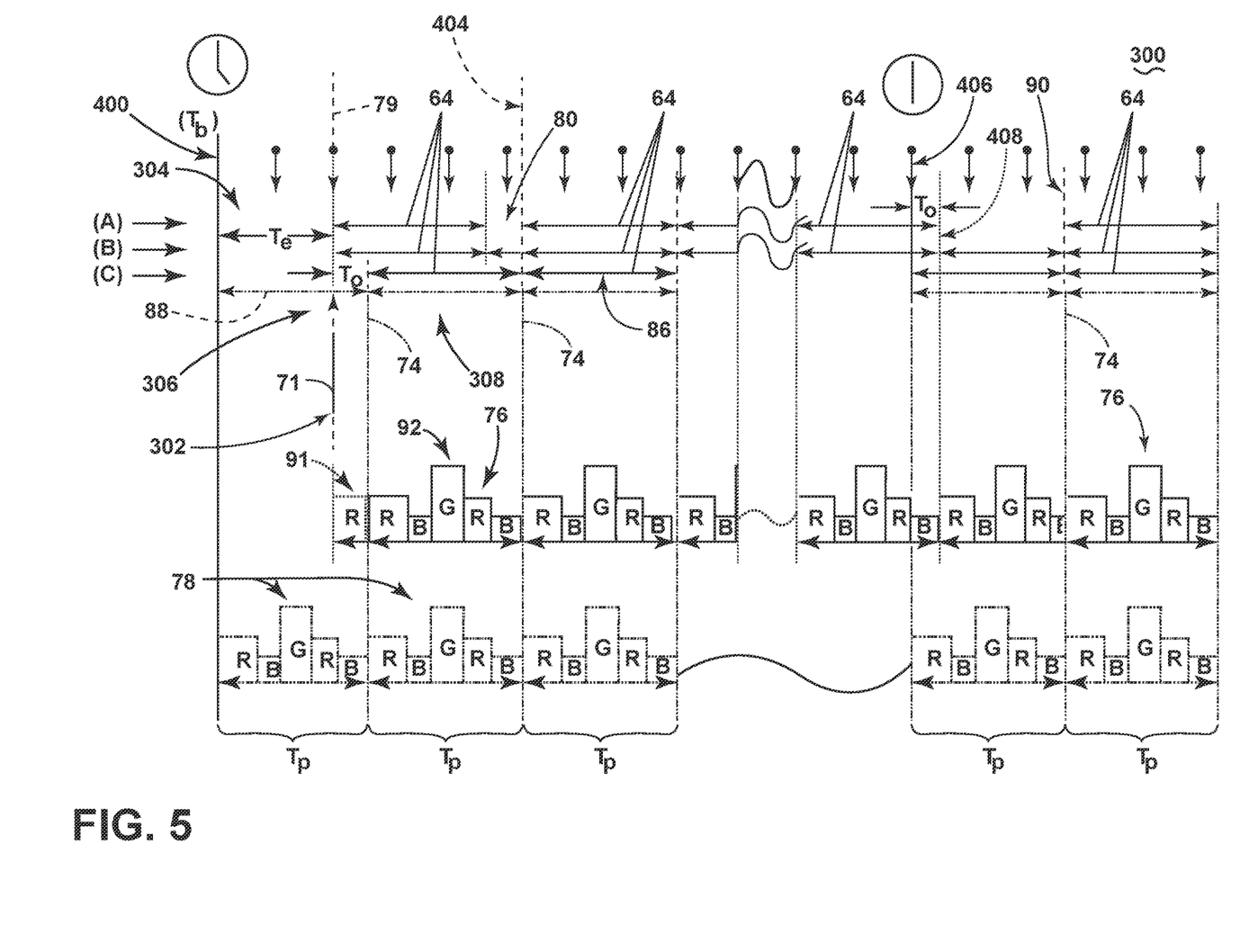
FIG. 5 is a schematic for a method of updating and outputting a common synchronized alert pattern by the synchronization signaling system.

Turning to FIG. 5, a schematic illustrating a method 300 of updating an output sequence for the set of alert devices as the common synchronized alert pattern 76 is illustrated. For understanding, a representative set of periodic alert cycles are illustrated defining a synchronized pattern period both at period 88 and near the bottom of the FIG. 5, such as an exemplary full alert pattern repeating cycle 78. Both the period 88 and the full alert pattern repeating cycle 78 can be based on the length of the desired or requested alert pattern or alert pattern cycle period defined by the alert pattern, received at the master controller 12. In another non-limiting example, the full alert pattern repeating cycle 78 can be defined by, or based on, a common alert pattern timing (e.g. wherein all alert patterns have a predetermined common period), or based on the timing reference signal 20. In one example, the full alert pattern repeating cycle 78 can be aligned referentially with the start of the master clock time ($T_b$, shown as a first master clock synchronization time 400) and define a synchronized alert period, as will be explained herein.

At 302 the pattern request 71 is received, by way of non-limiting example the alert pattern cycle 64 of flashing lights with a cycle of: Red, Blue, Green, Red, Blue, such as a. It should be understood while an exemplary Red, Blue, Green, Red, Blue pattern is given, the utilization of known Red and Blue lighting such as defined in SAE J845/J595 and also allowing a separate synchronization to include Amber or Green and white lighting with same or commonly offset timing within patterns is also contemplated.

In first and second exemplary scenarios (A) and (B), the requested alert pattern cycle associated with the pattern request 71 can be initiated immediately upon receiving the pattern request 71. By way of non-limiting example, the local time (t) when the pattern request 71 is received is 302. At 304 the master controller 12 can calculate an elapsed time ($T_e$) between a beginning master clock time ($T_b$), or the last time the timing reference signal 20 was received, by way of non-limiting example at the first master clock synchronization time 400, and an actual start time 79 for the alert pattern cycle 64, which in scenarios (A) and (B) is at time 302. At 306 the master controller 12 can determine an offset period of time ($T_o$) which is the difference between the alert cycle period ($T_p$) and the elapsed time ($T_e$) in the illustrated diagram. At 308 the master controller 12 can compensate for the differences determined or calculated between the master clock time and the local time, and adjust the alert pattern cycle 64 to appear as if starting at the beginning master clock time ($T_b$). In scenario (A) this can entail the master controller 12 pausing the alert pattern cycle 64 for a period 80 equal to the offset period of time ($T_o$) and starting again at updated time 74, also denoted as time 404. In scenario (B) this can entail restarting the alert pattern cycle 64 at the updated time 74 calculated by adding the offset time ($T_o$) to the alert cycle period ($T_p$).

In a third exemplary scenario (C), the alert pattern cycle 64 does not commence or execute at the time the pattern request 71 is received by the master controller 12. Instead, and as opposed to scenarios (A) and (B), scenario (C) performs the synchronization of the alert pattern cycle 64 by waiting until the beginning of the immediately following pattern start period (e.g. the next pattern start period aligned with the full alert pattern repeating cycle 78 or the synchronized alert period). In this sense, while a user may input a user input 13 at the time of the pattern request 71, the actual starting or execution of the alert pattern cycle 64 will not begin or start until the beginning of the immediately following synchronized pattern start period 78. It will be appreciated that any number of vehicles, emergency vehicles, alert units, or the like, will actually start or execute an alert pattern cycle 64 at a synchronized time period 78 common to each of the respective of vehicles, emergency vehicles, alert units, or the like, as each of immediately following synchronized pattern start period 78 are ultimate defined in or at each vehicles, emergency vehicles, alert units by way of the timing reference signal 20 from the master clock 18. Thus, a disparate or separately controllable set of vehicles, emergency vehicles, alert units can independently operate a set of alert patterns that are effectively or operably synchronized, in accordance with aspects of the disclosure.

In one example, as shown, a phantom pattern 91 is illustrated shown the beginning of an alert pattern cycle 64 that otherwise would have begun executing at the time of receiving the pattern request 71 at the master controller 12. Also shown is the actual start or execution of the synchronized alert pattern cycle 76, shown in solid line 92, in accordance with aspects of the disclosure. In this sense, the actual start or execution of the desired alert pattern cycle 64 can be delayed or otherwise held without execution until the start of the immediately following synchronized pattern start period 78. In one non-limiting example, the timing or the delay can include or be equal to the offset period of time ($T_o$) described herein, and can be used to compensate to the actual execution or beginning of the desired alert pattern cycle 76 until the immediately following pattern start period 78.

Over an extended period of time, the local clock 21 can drift or otherwise become unsynchronized with the timing reference signal 20. In that event, for example, as shown proximate to a second master clock synchronization time 406 of FIG. 5, a new receiving of the timing reference signal 20 at 406 can automatically trigger or otherwise execute aspects of the disclosure to reset or recalibrate the local clock 21 with the new receiving of the timing reference signal 20, in either scenario (A), (B), or (C). As explained herein, the signal synchronization system 10, 10a, 10b or the master controller 12 can then can determine an offset period of time ($T_o$) which is the difference between the alert cycle period ($T_p$) and the elapsed time ($T_e$, denoted 408), and can compensate for the differences determined or calculated between the master clock time and the local time, and adjust the alert pattern cycle 64 to begin or start the beginning of the immediately following pattern start period (e.g. the next pattern start period aligned with the full alert pattern repeating cycle 78 or the synchronized alert period).

As shown, the immediately following pattern start period 90 (now defined by the new receiving of the timing reference signal 20) can again cause the starting or execution of the alert pattern cycle 76 for the vehicle, emergency vehicle, or unit in synchronization with the pattern period 78, as shown.

The synchronized signaling system 10 can enable the coordination of controllers 12 within the two vehicles 56a, 56b adapted to independently receive the timing reference signal 20, then independently operate their respective synchronized signaling system 10 to operate the set of alert devices in sync with each other. The timing between receiving consecutive timing reference signals 20, can be variable across global, regional, or local approaches. Thus, a robust system of timing precision with variable master timing sourced timing updates, to account for situations where a single source of timing is not reliable, is able to achieve high precision coordination of multiple controllers 12.

The pattern request 71 received for each synchronization signaling system 10 associated with each vehicle is requested and inputted at what may be differing times, but the operation or execution of the alert signal pattern can be aligned, in accordance with the disclosure. The alert pattern cycles 64 can continue until updated by the master clock 18 as described previously.

Figure 6:
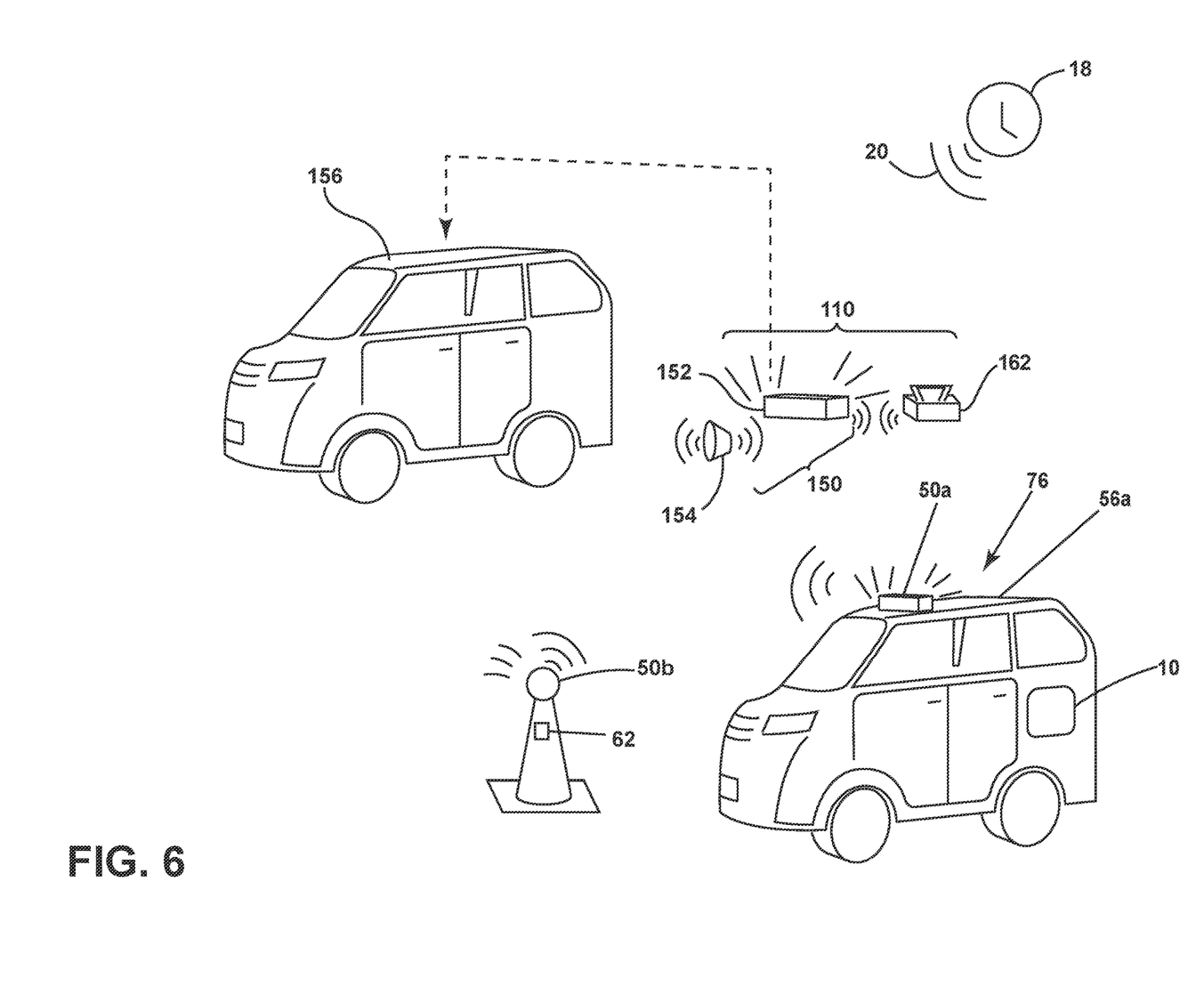
FIG. 6 is a schematic of a portable synchronization signaling system according to an aspect of the disclosure herein.

Turning to FIG. 6, a portable synchronization signaling system 110 is illustrated that is similar to the synchronization signaling system 10 described herein therefore, like parts will be described with like numerals increased by 100, with it being understood that the description of the like parts of the synchronization signaling system 10 applies to the portable synchronization signaling system 110, unless otherwise noted.

The portable synchronization signaling system 110 can include a portable interface 162 for operating a portable remote set of alert devices 150. The portable remote set of alert devices 150 can include visual outputs such as flashing lights, strobe lights, different color lights, LED lights, along with audio outputs such as sirens, speakers, horns, and any other type of alert device. By way of non-limiting example, the portable remote set of alert devices 150 is a removable lightbar 152 and siren 154 that can be temporarily mounted to a non-emergency vehicle 156 as illustrated by the dashed arrow. In one non-limiting example of temporary mounting, the portable remote set of alert devices 150, the removable lightbar 152, the siren 154, or a combination thereof, can include a mounting mechanism for an interior of a vehicle, an exterior of a vehicle, a combination thereof, and can include, for example, one or more magnets, adhesives, suction devices, straps, clamps, the like, or a combination thereof.

The master controller 12 for the synchronization signaling system 10, already described herein and illustrated as part of the emergency vehicle 56a, can be in communication with the portable interface 162 with a timing device (t) capable of receiving updates from the master clock 18 and enabling the portable synchronization signaling system 110 to synchronize with or become synchronized with the synchronization signaling system 10 in the emergency vehicle 56a as already described herein. In this manner the non-emergency vehicle 156 can become a temporary emergency vehicle in order to create larger presence of synchronized patterns in a given area. It should be understood that while a single emergency vehicle 56a is illustrated, multiple emergency vehicles 56a are contemplated.

It is further contemplated that the portable synchronization signaling system 110 can be in communication with the remote set of alert devices 50b. By way of non-limiting example, the portable interface 162 can send and receive signals to the separate interface 62 of the remote set of alert devices 50b. The separate interface 62 can command and operate the remote set of alert devices 50b as already described herein. It should be understood that while one remote alert device 50b is illustrated, multiple remote alert devices 50b are contemplated.

In one non-limiting example, a "kit" or "set" of the portable synchronization signaling system 110 can be packaged, sent, delivered, or otherwise provided to a user in order to convert an otherwise non-emergency vehicle or fleet of non-emergency vehicles into an emergency vehicle or fleet of emergency vehicles, simply by incorporating the "kit" components on the non-emergency vehicle or vehicles. For example, when dealing with an emergency response, such as after a weather incident (e.g. tornado, hurricane, flood, etc.), pre-configured emergency vehicles may be difficult to locate, or may be otherwise inoperable. By including the portable synchronization signaling system 110, operable or otherwise available vehicles can be converted while still providing the synchronization operations described herein, without the need for detailed configuration or set up procedures.

Figure 7:
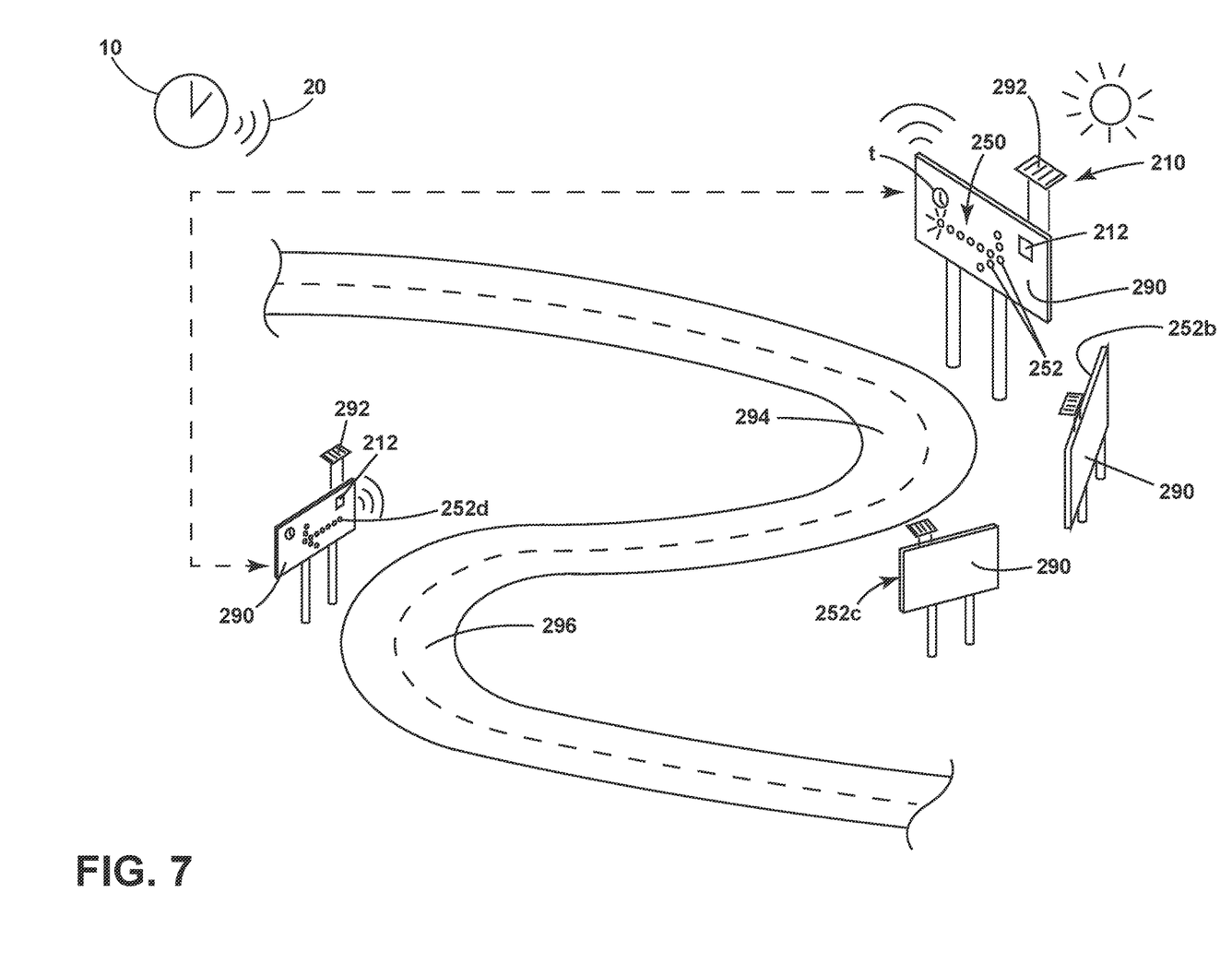
FIG. 7 is a schematic of a remote synchronization signaling system according to an aspect of the disclosure herein.

FIG. 7 illustrates a remote synchronization signaling system 210 similar to the synchronization signaling system 10 described herein therefore, like parts will be described with like numerals increased by 200, with it being understood that the description of the like parts of the synchronization signaling system 10 applies to the portable synchronization signaling system 210, unless otherwise noted.

The remote synchronization signaling system 210 can include a localized controller 212 which can be physically or wirelessly in communication with a localized set of alert devices 250. The term localized as used here means local to the remote synchronization signaling system 210. The localized set of alert devices 250 can include visual outputs such as flashing lights, strobe lights, different color lights, LED lights, along with audio outputs such as sirens, speakers, horns, and any other type of alert device. By way of non-limiting example, the localized set of alert devices 250 are a collection of lights 252 located on a road sign 290, illustrated as plurality of road signs 290 set up at a curve of a mountainous road where the remote synchronization signaling system 210 is utilized for synchronizing sequential signs.

The remote synchronization signaling system 210 can be powered by a remote power source 292, by way of non-limiting example a solar panel mounted to the road sign 290. In this manner, the remote synchronization signaling system 210 can be located in a remote location where a hard wire source for synchronization is either not available or difficult to establish.

It is contemplated that the remote synchronization signaling system 210 includes a timing device (t) that can be updated by the master clock 18 as previously described herein. In this manner, the localized set of alert devices 250 can become synchronized to alert oncoming traffic of an impending condition, including, but not limited to, a turn 294 as illustrated. By way of non-limiting example the collections of lights 252 can sequentially light up as a car approaches, where light 252a lights up first and then turns off when light 252b lights up, and then light 252c and so on. It is further contemplated that lights 252d light up sequentially to warn traffic of another upcoming turn. While a turn 294 is illustrated and described, any impending condition can be included, including, but not limited to, animal crossings, stops, falling rocks, emergency notifications, weather conditions, environmental conditions (e.g. steep inclines, flood zones, etc.), or the like.

The remote synchronization signaling system 210 can be set up to accept a timing reference signal 20 from the master clock 18 from multiple different approaches described herein. These may include, but are not limited to, the global master clock signal 22 which can include a GNSS clock, Global System for Mobile Communications (GSM) system clocking (e.g. country, state, or city wide), the regional master clock signal 24 which can include a drone-based regional broadcast signal, DSRC (e.g. sub-city), the local master clock signal 26 which can include a RF systems such as Bluetooth, WiFi, or light based LiFi, could also be a drone in a canyon situation (e.g. within a few city blocks, or at an intersection or accident). For example, a user or group of users with a first master clock signal 26 established by GNSS-based time code information may operate nearby to a utility vehicle with traffic management alerting devices operating with a different or second master clock signal 26 defined at a single location. It is envisioned that the different sources of master clock signal 26 can enable or otherwise allow for different synchronized scenarios indicating and communicating different meanings to the general public, or a viewer of the communication. Further in this example, a common group or set of vehicles can have a commonized signaling pattern and synchronization that is visually different than a utility vehicle with traffic alerting visual alerting.

A subset of the vehicles can have a first lighting pattern with the colors red and blue and synchronization of the first master clock signal 26, while the utility vehicle or a different subset of the vehicles can have a second lighting pattern with the colors of amber and white with synchronization of the second master clock signal 26, whereby the first master clock signal 26 and the second master clock signal 26 do not have synchronous relationships to each other.

It is contemplated that both the portable synchronization signaling system 110 and the remote synchronization signaling system 210 can utilize multiple master clock synchronization signal techniques, including in combination with the multiple sync sources as described herein. By way of non-limiting example in a mountainous location as illustrated, a signal from GNSS 30 may be possible at intermittent times, while an RSU 38 signal may be available at another time enabling the portable or remote synchronization signaling system 110, 210 to be updated by different sources.

The output for the multiple alert devices enables precise synchronized patterns in the form of a common synchronized alert pattern for an entire group of alert devices or units. For example, the common synchronized alert pattern can be in the form of visual control scheme patterns with the same overall period that sync with each other, or siren tones with similar looping periods that sync with each other. All color, lighting level, and flashing patterns can be organized to show a unified visual effect to nearby motorists, pedestrians, and surrounding individuals on or at a particular scene of said group of vehicles. Likewise, the perception of a highly coordinated group task execution, command and control with uniformity and a common service objective is achieved.

The precise coordination of electronic control signals for multiple vehicles can be used to coordinate visual effects like warning lighting or traffic management lighting, or synchronized audio such as siren tones with frequency or pattern matching across multiple vehicles, as well as occupant notification which includes maintenance data tagging. For example, all emergency vehicles can initiate a common visual pattern or audible pattern at a common clock timing, so patterns can be aligned (e.g. all lights flash in unison, or all sirens are aligned to generate the same sounds at the same time).

The synchronization signaling system enables precise and coordinated behavior for lighting and audio signaling with systems that have no direct signal connectivity. The approach described herein is to have periodic synchronous signals, trackers, data, clocks, or the like, update, align, synchronize, or relate the output for the set of alert devices described herein while in operation. The synchronization can be persistent while the vehicle is operational (e.g. powered by engine or electrical system, such as a battery), or can be persistent between vehicle operations (e.g. over multiple days, weeks, years, etc., even after powering off the vehicle).

Benefits associated with the synchronization signaling system described herein include enabling safety visibility for roadway vehicles such as first responder, law enforcement, traffic management, and the like to attain a coordinated, scheduled, aligned, complementary, or the like, visual or audible safety presentation as a unified or coordinated group of vehicles rather than a group of vehicles with random visual lighting or audible strategies. Stated another way, the plurality of vehicles can present a unified alert system, whereby individual alert systems (e.g. visible/audible) for each vehicle can be controlled, assigned, enabled, or otherwise operable under a common synchronized timing schema, the synchronization signaling system, for the benefit of appearing unified for an observer or viewer.

High speed differentials from First Responders vs general public, stopped vehicles vs traffic and so on warrant continued effort to make small improvements where possible in effort to reduce injury and deaths from incidents. Autonomous driving vehicles also have safety concerns operating around non-autonomous driving vehicles, which can include first responders.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A synchronization signaling system, comprising:
a portable interface physically separate from a motorized vehicle;
a portable set of alert devices comprising a plurality of alert devices each in communication with the portable interface, each of the plurality of alert devices comprising at least one of a visual or audio output for producing an alert pattern, and each of the plurality of alert devices adapted to be removably mounted to a non-vehicle unit or to the motorized vehicle to retrofit at least one of the non-vehicle unit or the motorized vehicle with at least one of the plurality of alert devices;
a master clock;
a timing device associated with each of the plurality of alert devices, the timing device capable of receiving updates from the master clock;
a master controller operably connected with the portable interface to control the plurality of alert devices;
wherein the timing device is periodically updated by the master clock in order to synchronize the alert pattern to a common synchronized alert pattern output by the plurality of alert devices.

2. The synchronization signaling system of claim 1 wherein the plurality of alert devices includes at least one of a visual output or an audio output.

3. The synchronization signaling system of claim 2 wherein the visual output is a removable lightbar for mounting to a vehicle.

4. The synchronization signaling system of claim 2 wherein the audio output is a siren for mounting to a vehicle.

5. The synchronization signaling system of claim 1 wherein the master controller is located in an emergency vehicle.

6. The synchronization signaling system of claim 1 wherein the common synchronized alert pattern is stored in a memory of the master controller.

7. The synchronization signaling system of claim 1 further comprising a remote set of alert devices having a separate interface in signal communication with the portable interface.

8. The synchronization signaling system of claim 1 wherein the synchronization signaling system can be packaged, sent, delivered, or otherwise provided to a user in order to convert at least one non-emergency vehicle into at least one emergency vehicle.

9. A remote synchronization signaling system, comprising:
a localized set of alert devices comprising a plurality of alert devices each having at least one of a visual or audio output for producing an alert pattern associated with an impending road condition;
a master clock;
a timing device associated with each of the plurality of alert devices, the timing device capable of receiving updates from the master clock;
a localized controller in proximity to and operably connected with the localized set of alert devices to control the localized set of alert devices; and
a remote power source for powering the remote synchronization signaling system;
wherein the localized set of alert devices are multiple sequential and individual alert devices each affixed to a non-vehicle unit and the timing device is periodically updated by the master clock in order to synchronize the alert pattern output of each sequential and individual alert device to a common synchronized alert pattern output by the localized set of alert devices; and
wherein the alert pattern activates when the remote synchronization signaling system senses an approaching vehicle, and the alert pattern is produced to alert the approaching vehicle of impending conditions.

10. The remote synchronization signaling system of claim 9 wherein the plurality of alert devices includes a visual output.

11. The remote synchronization signaling system of claim 10 wherein the visual output is a collection of lights located on at least one sign.

12. The remote synchronization signaling system of claim 11 wherein the at least one sign is a plurality of signs.

13. The remote synchronization signaling system of claim 12 the plurality of signs each include the multiple sequential alert devices.

14. The remote synchronization signaling system of claim 13 wherein the plurality of signs output the common synchronized alert pattern to alert traffic along a roadway of upcoming conditions.

15. The remote synchronization signaling system of claim 9 further comprising a remote power source.

16. The remote synchronization signaling system of claim 15 wherein the remote power source is a solar panel.

17. The remote synchronization signaling system of claim 9 wherein the common synchronized alert pattern is stored in a memory of the localized controller.

18. The remote synchronization signaling system of claim 9 wherein updates from the master clock come in the form of a global navigational satellite system clock signal, Global System for Mobile Communications system clocking signal, a drone-based regional broadcast signal, Dedicated Short Range Communications Service signal, a Bluetooth signal, WiFi signal, or light based LiFi signal.

19. The synchronization signaling system of claim 7 wherein the remote set of alert devices are adapted to be removably mounted to a non-vehicle unit.

20. The synchronization signaling system of claim 1 wherein at least one of the plurality of alert devices is mounted to at least one of a surface of the non-vehicle unit or a surface of the motorized vehicle.

21. A synchronization signaling system comprising:
- a portable kit comprising:
  - an interface;
  - a plurality of alert devices each in communication with the interface, each of the plurality of alert devices comprising at least one of a visual or audio output for producing an alert pattern;
- a master clock;
- a timing device associated with each of the plurality of alert devices, the timing device capable of receiving updates from the master clock; and
- a master controller operably connected with the interface to control the plurality of alert devices;
- wherein the timing device is periodically updated by the master clock in order to synchronize the alert pattern to a common synchronized alert pattern output by the plurality of alert devices;
- and wherein the portable kit is used to retrofit a non-vehicle unit, a motorized vehicle, or a fleet of non-vehicle units and motorized vehicles into an emergency unit, an emergency vehicle, or a fleet of emergency units and vehicles, by incorporating at least one of the plurality of alert devices onto at least one of the non-vehicle units or the motorized vehicles.

* * * * *